April 6, 1926. 1,579,260
D. M. TILLER
CABLE MEASURING DEVICE
Original Filed April 18, 1924   2 Sheets-Sheet 1
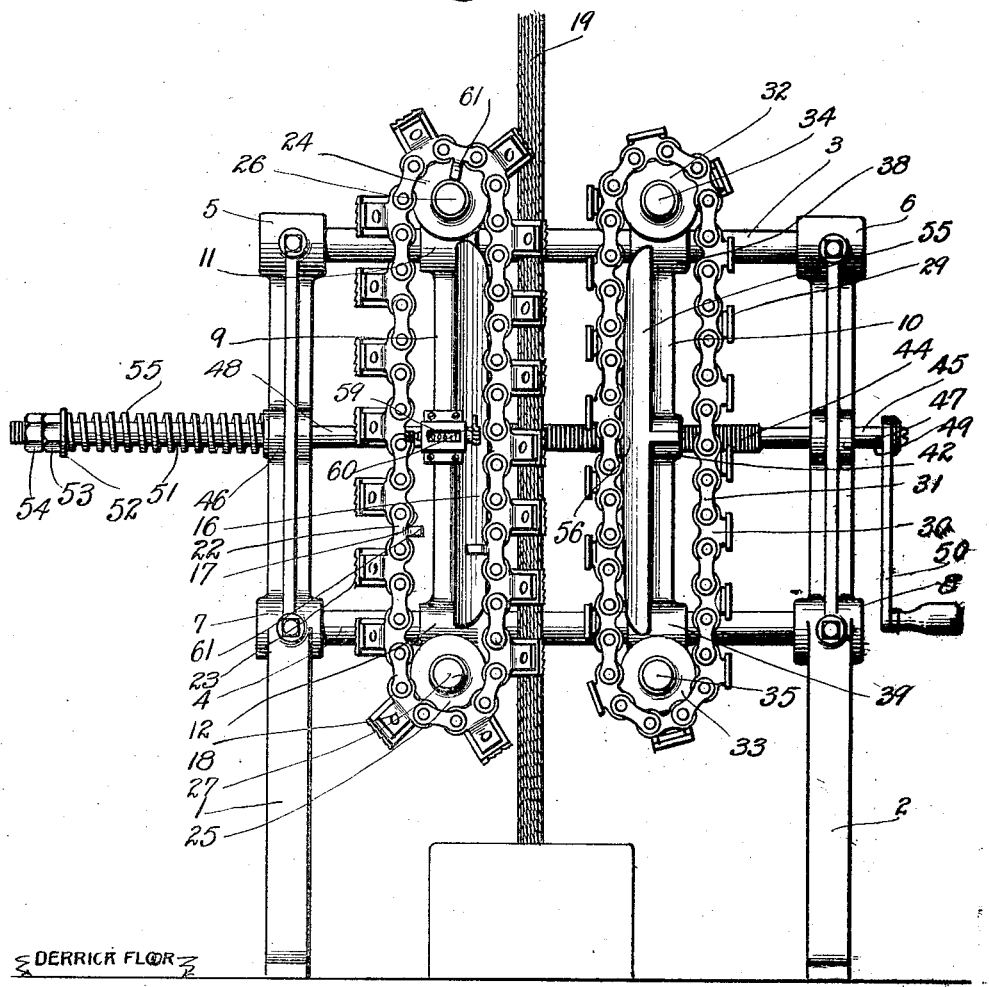
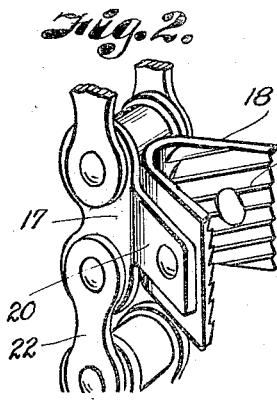
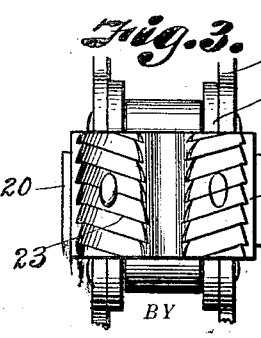
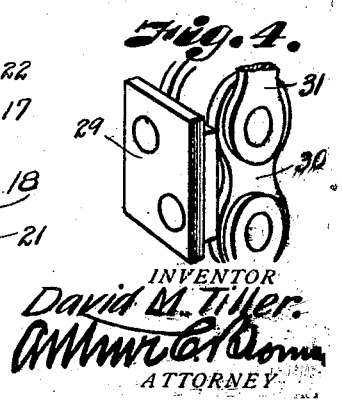
INVENTOR
David M. Tiller.
ATTORNEY April 6, 1926.
D. M. TILLER
CABLE MEASURING DEVICE
Original Filed April 18, 1924   2 Sheets-Sheet 2
1,579,260
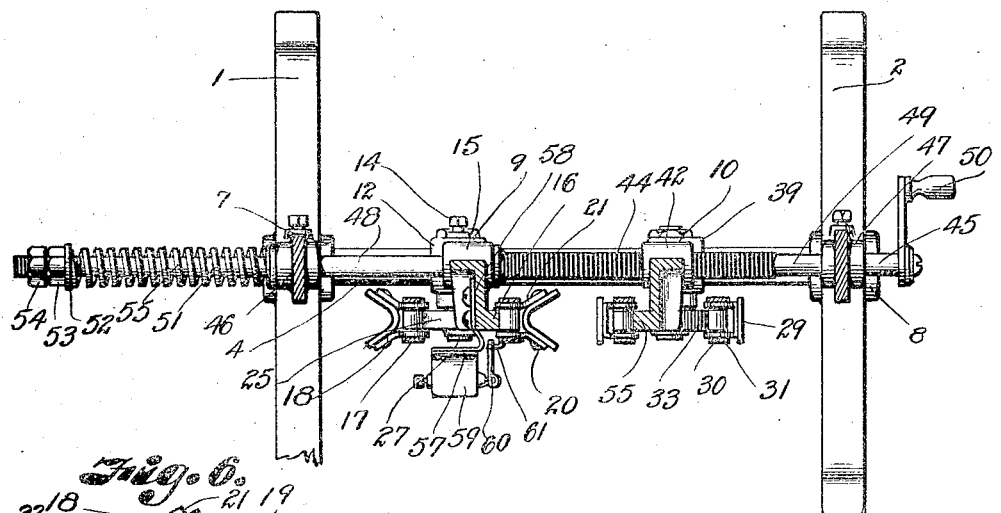
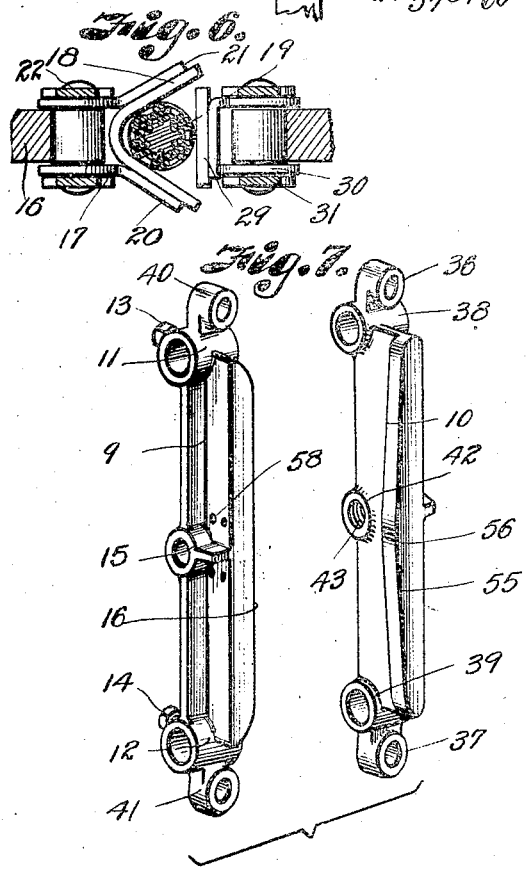
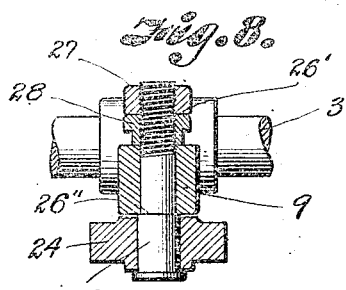
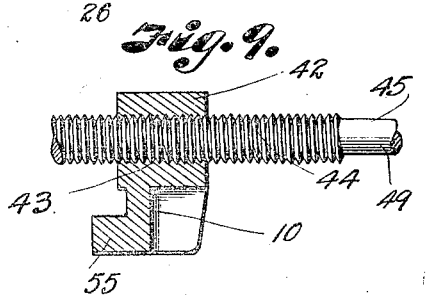
INVENTOR
David M. Tiller.
BY
ATTORNEY Patented Apr. 6, 1926.

1,579,260

UNITED STATES PATENT OFFICE.

DAVID M. TILLER, OF KANSAS CITY, MISSOURI, ASSIGNOR TO S. H. HALE, OF KANSAS CITY, MISSOURI.

CABLE-MEASURING DEVICE.

Continuation of application Serial No. 707,399, filed April 18, 1924. This application filed March 2, 1925. Serial No. 12,692.

*To all whom it may concern:*

Be it known that I, DAVID M. TILLER, a citizen of the United States, residing at Kansas City, in the county of Jackson and State of Missouri, have invented certain new and useful Improvements in Cable-Measuring Devices; and I do declare the following to be a full, clear, and exact description of the invention, such as will enable others skilled in the art to which it appertains to make and use the same, reference being had to the accompanying drawings, and to the figures of reference marked thereon, which form a part of this application.

This invention relates to cable measuring device particularly designed to measure the cable used in connection with oil wells, and the invention is specifically intended, although not necessarily limited, for use in measuring the drilling cable.

The invention contemplates the provision of means for engaging the cable as it passes between jaw members, or their equivalents, to move the members and through them communicate movement to certain registering mechanism which will accurately indicate the length of the cable which was moved past a given point.

This application is a continuation of an application filed by me on April 18, 1924, Serial No. 707,399 for "well measuring device."

The novel construction of my invention will be specifically referred to hereinafter, reference being had to the following description in connection with the accompanying drawings, in which—

Fig. 1 is a side elevational view of the measuring device constructed in accordance with my invention, the cable being shown in position to be clamped between two jaws.

Fig. 2 is a perspective view of one of the jaws.

Fig. 3 is a front view of one of the jaws.

Fig. 4 is a perspective view of a complementary jaw or pad to co-operate with one of the jaws shown in Figs. 2 and 3.

Fig. 5 is a cross sectional view through the measuring device.

Fig. 6 is a plan view of two complementary jaws with the cable clamped between them.

Fig. 7 is a perspective view of two brackets constituting pulley carriers for chains upon which the jaws are mounted.

Fig. 8 is a cross sectional view through one of the bracket members and through one of the pulleys, the shaft bolt for the pulley being shown in elevation, and Fig. 9 is a sectional view through one of the pulley carriers showing the adjusting screw.

The reference numerals 1 and 2 designate two trusses which support the mechanism. The two trusses 1 and 2 are connected by guide shafts 3 and 4 fastened to the collars 5, 6, 7 and 8 by suitable fastening devices. The guide shafts 3 and 4 support the two bracket members 9 and 10. The bracket member 9 has two sleeves 11 and 12, one near each end, which are adapted to sleeve over the shafts 3 and 4. The sleeves are capable of being fastened rigidly to the shafts 3 and 4 by fastening devices 13 and 14. The central portion of the bracket 9 has a plain collar 15 through which an un-threaded portion of an adjusting screw may pass. Integral with the main portion of the bracket (which is in the form of an angle) is an elongated guide flange 16 against which the links 17 of a chain may bear when the jaw members 18, which it carries, are in position to engage the cable 19. The links 17 are provided with flanged jaw brackets 20 and 21 to which the jaw members 18 are riveted or otherwise secured. Intermediate links 22 do not have the brackets 20 and 21 because they do not carry jaws. The jaw members 18 are V-shaped in cross section, that is the sides diverge from the center, and they are provided with diagonal teeth 23 adapted to sufficiently bite into the strands of the cable to cause a positive engagement between the jaws and the cable, although the "bite" will not be sufficient to mar the cable or cut the strands. The chain, consisting of the links 17 and 22 properly connected together, passes around pulleys 24 and 25 on the stub shafts 26 and 27 carried by the collars 40 and 41. The stub shafts are fastened by suitable nuts on the threaded end 26' of each stub shaft. One such stub shaft is shown in Fig. 8 as fastened to its collar by jam nuts 27 and 28 and in order that the pulley will not bind against the collar the stub shaft is slightly enlarged at 26″ which constitutes the bearing for the pulley, the enlarged portion 26″ being slighty larger than the bore of the collar so that a shoulder is formed.

The guide rail 16 prevents the jaw members from swinging outwadly away from a straight line, that is, away from the cable 19. The jaws 18 cooperate with complementary jaws or pads 29 on the links 30 of a chain made up of the links 30 and connecting links 31.

The links of the second chain pass around pulleys 32 and 33 on shafts 34 and 35 in the collars 36 and 37 at right angles to the collars 38 and 39 on member 10, the collars 38 and 39 being sleeved on the shafts 3 and 4. The member 10 supports the shafts 34 and 35 in substantially the manner shown in Fig. 8, therefore the collars 36 and 37 are like the collars 40 and 41 on member 9. The collars 36, 37, 40 and 41 really constitute bearings for the shafts which carry the pulleys. The intermediate collar 42 on the member 10 is threaded as at 43 (see Fig. 7) to receive the threads 44 of an actuating screw shaft 45 loosely mounted in the bearings 46 and 47 on the trusses 1 and 2. The unthreaded portion 48 of the shaft 45 passes through the collar 15 and through the bearing 46. The unthreaded portion 49 of the shaft 45 passes through the bearing 47 and it carries a crank 50 so that the shaft 45 can be turned to move the member 10 toward and away from the member 9. The end 51 of shaft 45, which projects through the bearing 46, carries a spring seat 52 held in place by the nuts 53 and 54. One end of an expansion spring bears against the seat 52, the other end bearing against the truss 1, consequently when the shaft 45 is turned it will move the carrier 10 toward the cable until the pads 29 contact with the cable to force it into intimate contact with the teeth 23 of the jaw 18, then the spring is put under compression so that its expansive force tends to yieldingly hold the pads 29 against the cable and thereby yieldingly hold the cable against the jaws 18.

In order to insure proper jaw engagement the member 10 is provided with a link guide face 55 which is curved outwardly from the ends toward the center in a relatively wide arc so that the central portion 56 will be nearer the guide face 16. This insures intimate contact between the jaws.

In order to measure the cable I provide a bracket 57 which is fastened to the part 58 of the member 9. The bracket carries a register 59 with an arm 60 thereon which is adapted to be actuated by the teeth or projections 61 carried by the links 22. These projections 61 are spaced proper distances apart, say one foot, so that as the chain, consisting of the links 17 and 22, pass around the pulleys 24 and 25 they will successively strike against the arm 60 to operate the register 59, therefore the actual length of cable passing through the mechanism can be determined.

It is important to have properly designed jaws on account of the wrap of the cable which usually consists of wire rope so unless a proper intimate engagement is had between the jaws and the cable, the cable will slip with respect to the jaws. This is impossible with the jaw construction illustrated because the cable will be wedged in the crotch of the jaws and the teeth will sufficiently engage the cable to prevent slipping.

What I claim and desire to secure by Letters-Patent is:

1. A cable measuring device comprising a base, upstanding brackets mounted on the base, one of said brackets being adjustable on the base in relation to the other, endless belts movably mounted on the brackets, V-shaped jaws on one of the belts, means on the other belt for inducing engagement of a cable with the V-shaped jaws, means for maintaining said jaws and said engagement inducing means in co-operative relation, registering mechanism, and means actuated by one of said belts for operating the register mechanism.

2. A cable measuring device comprising a base, upstanding brackets on the base, one adjustable relative to the other, endless belts movably mounted on the brackets, V-shaped jaws on one of the belts having teeth on their inner faces, means on the other belt for inducing engagement of a cable with the V-shaped jaws, means for maintaining said jaws and said engagement inducing means in co-operative relation, register mechanism, and means actuated by one of the belts for operating the register mechanism.

3. A cable measuring device comprising supporting trusses, guide shafts connecting the trusses, brackets sleeved on the guide shafts, one of the brackets being fixed relative to the other, means for yieldingly urging the other bracket toward the first named bracket, endless belts movably mounted on the brackets, jaws on the belts for clamping a cable between them, and register mechanism operable from one of the belts.

4. In a cable measuring device, a supporting frame comprising spaced trusses and connecting guide shafts, brackets sleeved on the guide shafts, one of the brackets being slidable on the shafts toward and away from the other bracket, endless belts movably mounted on said brackets, cable engaging jaws mounted on said belts, means for urging one of the brackets toward the other, and register mechanism operable by one of the belts.

5. A cable measuring device comprising a supporting frame, vertical brackets mounted in spaced relation on the frame, one of the brackets being movable on the frame toward and from the other, endless belts movably mounted on the brackets, V-shaped jaws on one of the belts, jaws mounted on the other belt, having flat faces complementary to the V-shaped jaws, to grip a cable therebetween, means for effecting relative movement between the jaws, and registering mechanism operable from one of the belts.

6. A cable measuring machine, comprising a support, brackets on the support, one adjustable with respect to the other, pulleys on the brackets, belts carried by the pulleys, a straight guide edge on one of the brackets, offset outwardly from the peripheries of the pulleys, guiding the belts, a guide edge on the other bracket having a central portion nearer the straight guide edge than the remaining portion, jaws carried by the belts, and registering mechanism actuated by the belts.

7. A cable measuring device, comprising a supporting frame consisting of trusses and guide shafts connecting them, vertical bracket bars mounted on the guide shafts, pulleys carried by the vertical bars near their ends, a straight longitudinal guiding edge portion on one of the bars, a guide portion on the other bar curved outward from each end of the bar to the middle, belts carried by the pulleys passing over the guide edges, complementary jaw members carried by the belts, a screw shaft passing through the trusses and through the bars in threaded engagement with one of the bars, and means for actuating said screw.

8. A cable measuring device, comprising a supporting frame including horizontal guide shafts, vertical bars supported near their ends by said guide shafts, one bar being fixed and the other slidable on the guide shafts, pulleys carried by the bars, chains on the pulleys, complementary jaws on the respective belts to grip a cable between them, a screw shaft having a threaded connection with one of the bars, projecting through the other bar and through the support, a spring stop on the end of the screw shaft, and a coil spring on the projecting portion of the screw shaft, one end of the spring bearing against the support and the other against the stop.

In testimony whereof I affix my signature.

DAVID M. TILLER.